(12) United States Patent
Na et al.

(10) Patent No.: US 8,029,681 B2
(45) Date of Patent: Oct. 4, 2011

(54) MASTER RECORDING MEDIUM FOR MAGNETICALLY TRANSFERRING SERVO PATTERN TO THE MAGNETIC RECORDING MEDIUM AND METHOD OF MANUFACTURING THE SAME

(75) Inventors: Kyoung-won Na, Seoul (KR); Sang-chul Sul, Suwon-si (KR); Du-hyun Lee, Suwon-si (KR); Myung-bok Lee, Suwon-si (KR); Hae-sung Kim, Hwaseong-si (KR); Jin-seung Sohn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 12/470,778

(22) Filed: May 22, 2009

(65) Prior Publication Data

US 2009/0297889 A1    Dec. 3, 2009

(30) Foreign Application Priority Data

May 27, 2008  (KR) .................. 10-2008-0049290

(51) Int. Cl.
*B44C 1/22* (2006.01)
*B81C 1/00* (2006.01)
(52) U.S. Cl. ....... 216/11; 216/22; 204/192.34; 977/856; 977/887
(58) Field of Classification Search .................. None
See application file for complete search history.

(56) References Cited

U.S. PATENT DOCUMENTS

| | | | | |
|---|---|---|---|---|
| 6,805,966 B1 * | 10/2004 | Formato et al. | ............... | 428/457 |
| 7,074,341 B1 * | 7/2006 | Kurataka et al. | ................. | 216/22 |
| 7,150,844 B2 * | 12/2006 | Deeman et al. | ............... | 264/220 |
| 7,199,953 B2 * | 4/2007 | Nishikawa et al. | ............. | 360/17 |
| 7,229,743 B2 * | 6/2007 | Usa et al. | ...................... | 430/296 |
| 7,462,292 B2 * | 12/2008 | Lee | ................... | 216/54 |
| 7,776,388 B2 * | 8/2010 | Dobisz et al. | ................. | 427/129 |
| 2005/0006336 A1 * | 1/2005 | Takahata et al. | ................. | 216/22 |
| 2008/0226946 A1 * | 9/2008 | Moribe et al. | ............... | 428/810 |
| 2009/0141382 A1 * | 6/2009 | Kido et al. | ..................... | 360/16 |
| 2009/0244749 A1 * | 10/2009 | Nishida et al. | .................. | 360/17 |
| 2010/0078858 A1 * | 4/2010 | Nishikawa | .................... | 264/427 |

* cited by examiner

*Primary Examiner* — Anita Alanko
(74) *Attorney, Agent, or Firm* — Sughrue Mion, PLLC

(57) ABSTRACT

Provided are a master recording medium and a method of manufacturing the master recording medium. The master recording medium includes: a plate; and a magnetic layer which is formed on the plate for magnetically transferring of a servo pattern that is to be formed on a magnetic recording medium. The method of manufacturing a master recording medium includes: engraving a polymer layer by nano imprinting to form an engraved pattern corresponding to a servo pattern to be formed on a magnetic recording medium; forming a magnetic layer which fills in the engraved pattern of the polymer layer; forming a back plate layer on the magnetic layer; and performing processing to expose the servo pattern on a surface of the magnetic layer that is opposite a surface of the magnetic layer on which the back plate layer is formed.

10 Claims, 7 Drawing Sheets

MASTER RECORDING MEDIUM FOR MAGNETICALLY TRANSFERRING SERVO PATTERN TO THE MAGNETIC RECORDING MEDIUM AND METHOD OF MANUFACTURING THE SAME

CROSS-REFERENCE TO RELATED PATENT APPLICATION

This application claims priority from Korean Patent Application No. 10-2008-0049290, filed on May 27, 2008 in the Korean Intellectual Property Office, the disclosure of which is incorporated herein in its entirety by reference.

BACKGROUND OF THE INVENTION

1. Field of the Invention

The present invention relates to a magnetic recording technology, and more particularly, to a master recording medium for magnetically transferring a servo pattern including servo information to a magnetic recording medium and a method of manufacturing the master recording medium.

2. Description of the Related Art

Hard disc drives (HDDs) using a magnetic recording medium have characteristics of high capacity and fast access and thus are significant as data memory devices of various digital devices, in addition to computers. Also, since industrialization and informatization have rapidly developed, the amount of information that is dealt with has significantly increased and thus higher density HDDs are required.

In order to drive an HDD, servo information should be pre-recorded to a magnetic recording medium so as to allow a magnetic head to be properly positioned at a desired location on the magnetic recording medium. The servo information is recorded by a servo pattern formed by magnetizing a recording layer of the magnetic recording medium to a predetermined pattern and the servo pattern is formed by magnetic transferring a master recording medium on which a shape corresponding to the pattern is formed.

In a high-density HDD, a line-width of the servo pattern should be reduced in accordance with the increasing density of data storage. As such, research into forming a servo pattern corresponding to the high-density recording is needed.

SUMMARY OF THE INVENTION

The present invention provides a master recording medium for magnetic transferring a servo pattern having a fine line width to a magnetic recording medium and a method of manufacturing the master recording medium.

According to an aspect of the present invention, there is provided a master recording medium including: a plate; and a magnetic layer which is formed on the plate for magnetically transferring of a servo pattern that is to be formed on a magnetic recording medium.

The magnetic layer may be filled in the engraved pattern formed on the polymer layer.

The servo pattern may be embossed on the magnetic layer.

According to another aspect of the present invention, there is provided a method of manufacturing a master recording medium, the method including: engraving a polymer layer by nano imprinting to form an engraved pattern corresponding to a servo pattern to be formed on a magnetic recording medium; forming a magnetic layer which fills the engraved pattern of the polymer layer; forming a back plate layer on the magnetic layer; performing processing to expose the servo pattern on a surface of the magnetic layer that is opposite a surface of the magnetic layer on which the back plate layer is formed.

The engraving the polymer layer may include: forming a seed layer on the substrate; forming a polymer layer on the seed layer; preparing; imprinting the polymer layer with a nano stamp on which the servo pattern is embossed; and removing a residue of the polymer layer remaining in an imprinted part of the polymer layer.

The magnetic layer may be formed by plating.

The engraving the polymer layer may include: forming a polymer layer on a substrate; imprinting the polymer layer with a nano stamp on which the servo pattern is embossed.

The magnetic layer is formed by sputtering.

According to another aspect of the present invention, there is provided a method of manufacturing a master recording medium, the method including: (a) nano imprinting a stamp on which a servo pattern to be formed on a magnetic recording medium is engraved and embossing the servo pattern on a polymer layer; and (b) forming a magnetic layer along the surface of the polymer layer on which the servo pattern is embossed.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
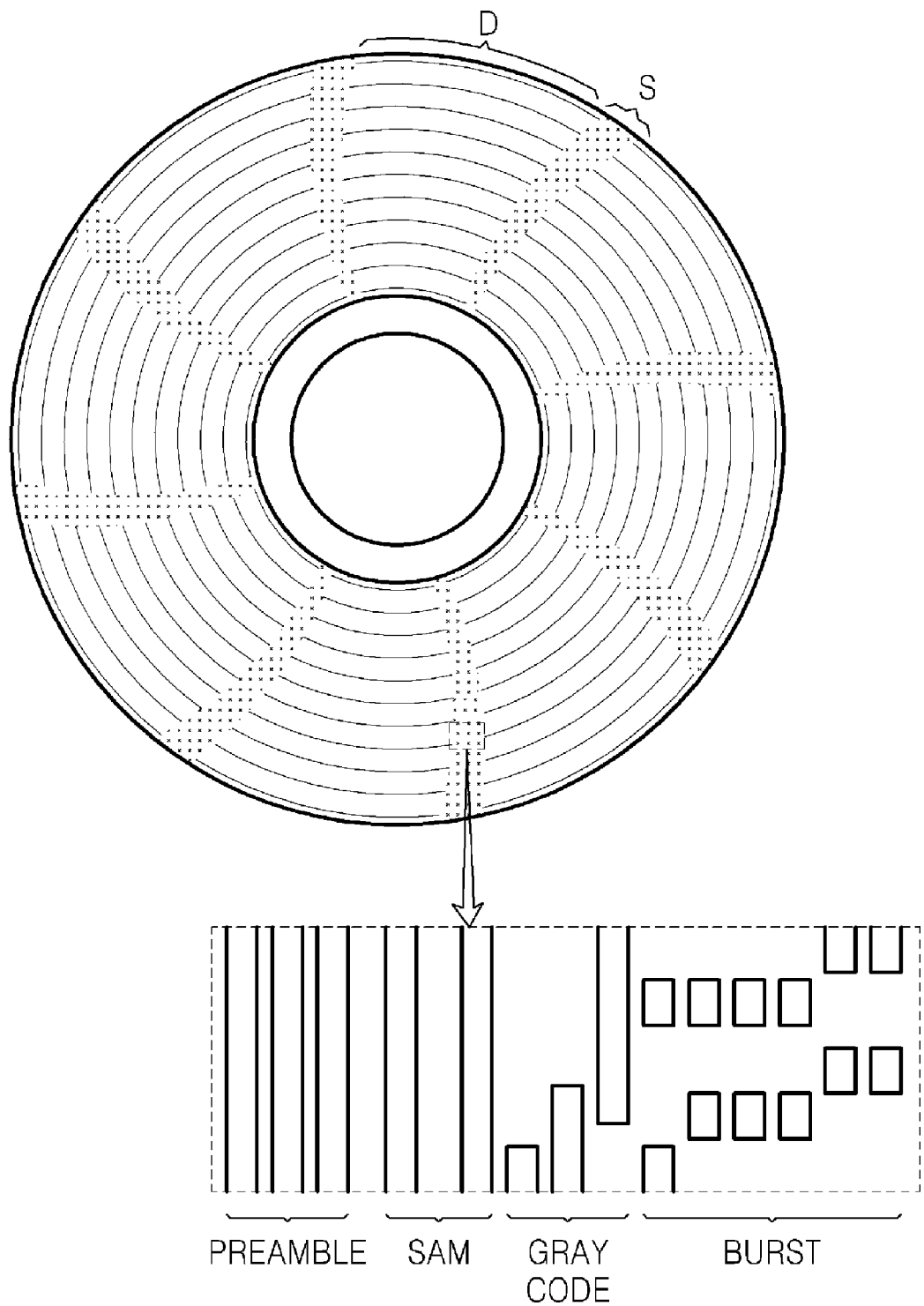
FIG. 1 illustrates a structure of a general magnetic recording medium.

Hereinafter, the present invention will be described more fully with reference to the accompanying drawings, in which exemplary embodiments of the invention are shown. In the drawings, like reference numerals denote like elements, and the sizes and thicknesses of layers and regions are exaggerated for clarity.

Before describing a master recording medium and a method of manufacturing the master recording medium according to the present invention, a method of forming a servo pattern in a magnetic recording medium used in a hard disc drive (HDD) is firstly described with reference to FIGS. 1 and 2. FIG. 1 illustrates a structure of a general magnetic recording medium.

Referring to FIG. 1, the magnetic recording medium has a disk shape and includes a plurality of circular tracks which are divided into a data sector D to which data is recorded and a servo sector S to which servo information on the tracks is recorded. In the servo sector S, the servo pattern formed by magnetizing the region thereof to a specific pattern is formed. The servo pattern may include a preamble, a servo address mark (SAM), a gray code, and a burst, the preamble providing servo synchronization, SAM providing synchronization for reading the grey code by informing start of the servo sector S, the gray code providing a track ID, and the burst providing information for calculating a position error signal required to follow the track. The patterns shown are only examples so that the forms of the patterns vary according to the track. When an HDD performs recording and reproducing with respect to the magnetic recording medium, servo information is read from the servo pattern of the servo sector S and thus HDD performs seeking and following the track.

Figure 2:
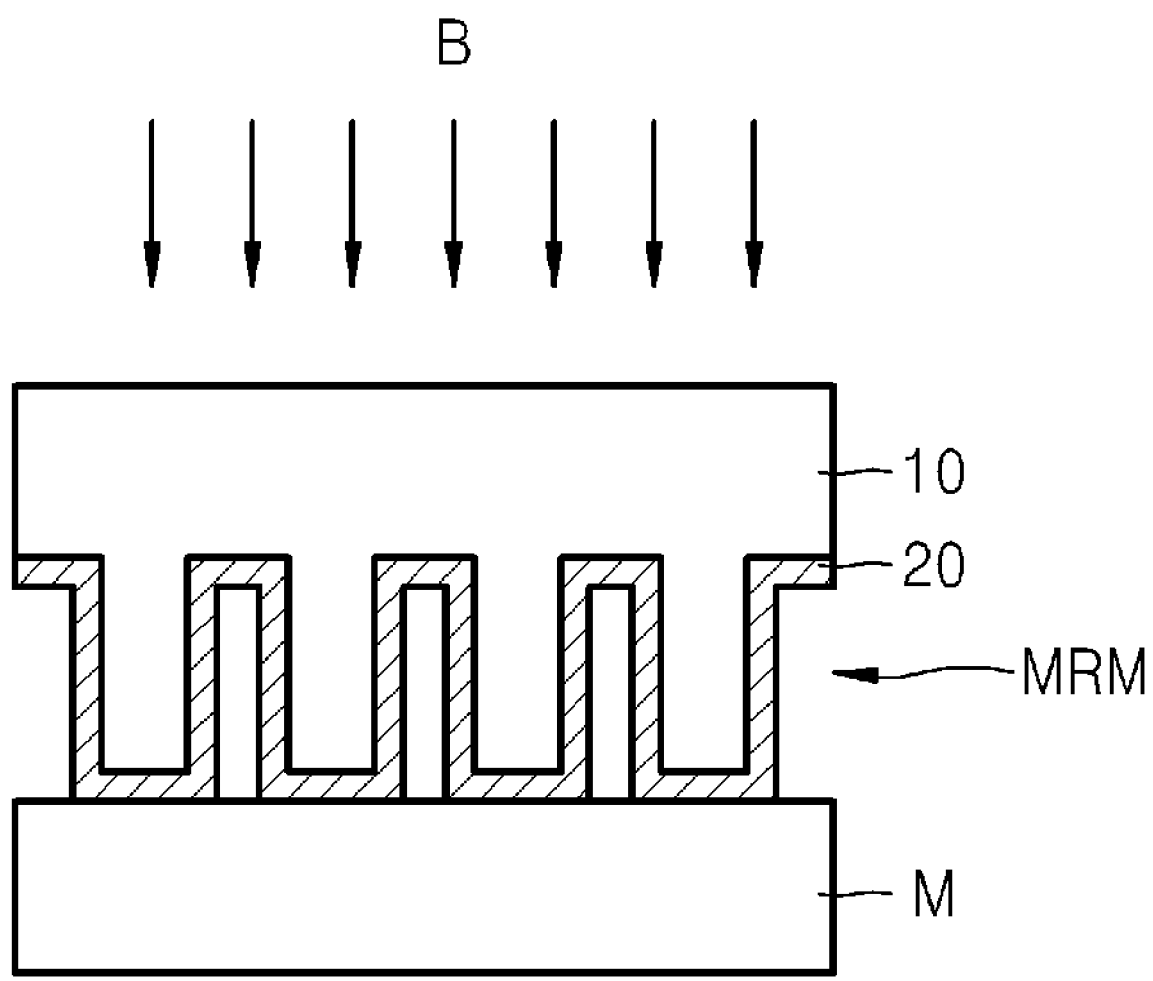
FIG. 2 illustrates magnetic transferring a servo pattern to a magnetic recording medium.

FIG. 2 illustrates magnetic transferring a servo pattern to a magnetic recording medium.

Referring to FIG. 2, forming of the servo pattern as described above on the magnetic recording medium is shown. In order to form the servo pattern on the magnetic recording medium M, a master recording medium (MRM) is used to magnetically transfer the servo pattern that is to be formed. For example, MRM includes a substrate 10 on which a pattern is formed to protrude therefrom and a magnetic layer 20 formed of a material such as CoFe which is formed along the surface of the pattern. The MRM is placed on the magnetic recording medium M on which the servo pattern is to be formed and external magnetic field B is applied thereto. According to the external magnetic field B, the magnetic layer 20 of MRM and a recording layer on an upper layer of the magnetic recording medium M are magnetized. Here, the magnetized pattern of the magnetic recording medium M becomes the same as the pattern of the MRM.

FIGS. 3 through 7 are cross-sectional diagrams of master recording mediums according to various exemplary embodiments of the present invention and illustrate manufacturing the master recording mediums based on the process order.

The methods of manufacturing a master recording medium according to the exemplary embodiments of the present invention include: engraving in a polymer layer a servo pattern to be formed on a magnetic recording medium by nano imprinting; forming a magnetic layer to fill the engraved region of the polymer layer and forming a back plate layer on the magnetic layer; and performing processing for the servo pattern to appear on the surface of the magnetic layer that is the side opposite to the back plate layer.

Figure 3:
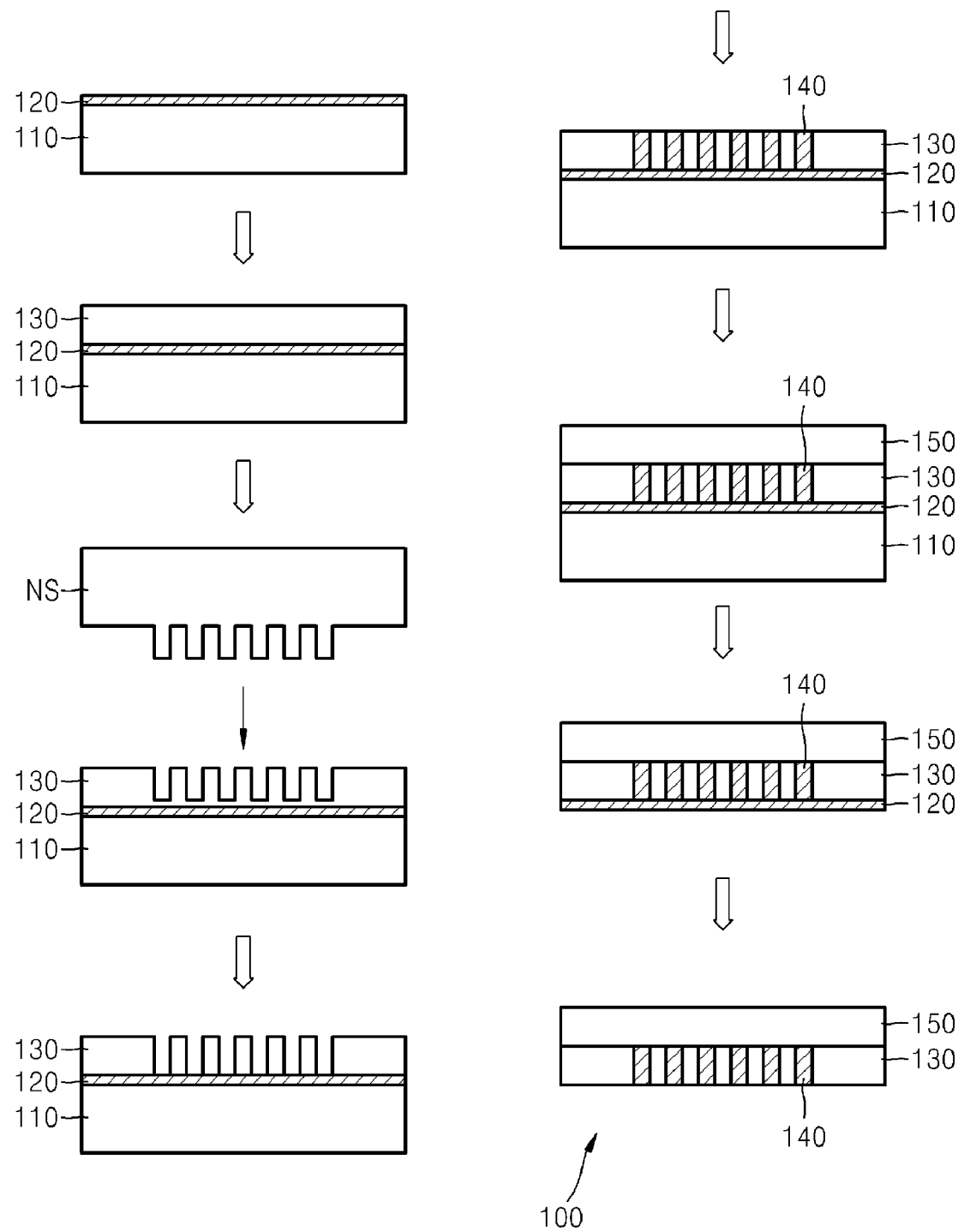
FIG. 3 illustrates a method of manufacturing a master recording medium according to an exemplary embodiment of the present invention.

Referring to FIG. 3, a seed layer 120 and a polymer layer 130 are sequentially formed on a substrate 110. The seed layer 120 is formed for magnetic material plating in a later process and may be formed of a magnetic layer or a layer formed of Ti/Au or Ta/Cr. The polymer layer 130 may be used for nano imprinting and formed of resin by using depositing, coating, spin-coating, or dipping.

Then, a nano stamp (NS) on which the servo pattern is embossed is prepared and is used to nano imprint to the polymer layer 130, thereby engraving the servo pattern on the polymer layer 130. In the nano imprinting process, the fine patterned NS is disposed on the polymer layer 130 which is flexible and heat and pressure is applied to the polymer layer 130 so that the polymer layer 130 is hardened and then the pattern is transferred, thereby forming a fine line width.

Then, a residue of the polymer layer 130 remaining in the engraved part of the polymer layer 130 is removed using, for example, an $O_2$ reactive ion etching (RIE) process.

Then, the magnetic material is plated with the engraved part of the polymer layer 130, thereby forming a magnetic layer 140. The magnetic layer 140 has the shape patterned as the servo pattern. Examples of the magnetic material may include CoFe, CoNiFe, and NiFe.

Then, a back plate layer 150 is formed. The back plate layer 150 is used as a substrate of a stamp formed as a master recording medium and may be formed of a metal such as Ni, CoFe, NiCoFe, and NiFe or an organic material such as PET, polymer, and resin.

Then, the substrate 110 and the seed layer 120 are removed so that the pattern of the magnetic layer 140 is exposed from the lower surface. The substrate 110 and the seed layer 120 may be removed by using a wet etching process or a dry etching process and the process is selected according to the material forming the substrate 110 or the seed layer 120.

According to the above process, a master recording medium 100 including the patterned magnetic layer 140 is manufactured for magnetic transferring the servo pattern based on the description in FIG. 2. Here, a nano imprinting process is used so that the line width of the pattern of the magnetic layer 140 can be realized to approximately 60 nm or below.

Figure 4:
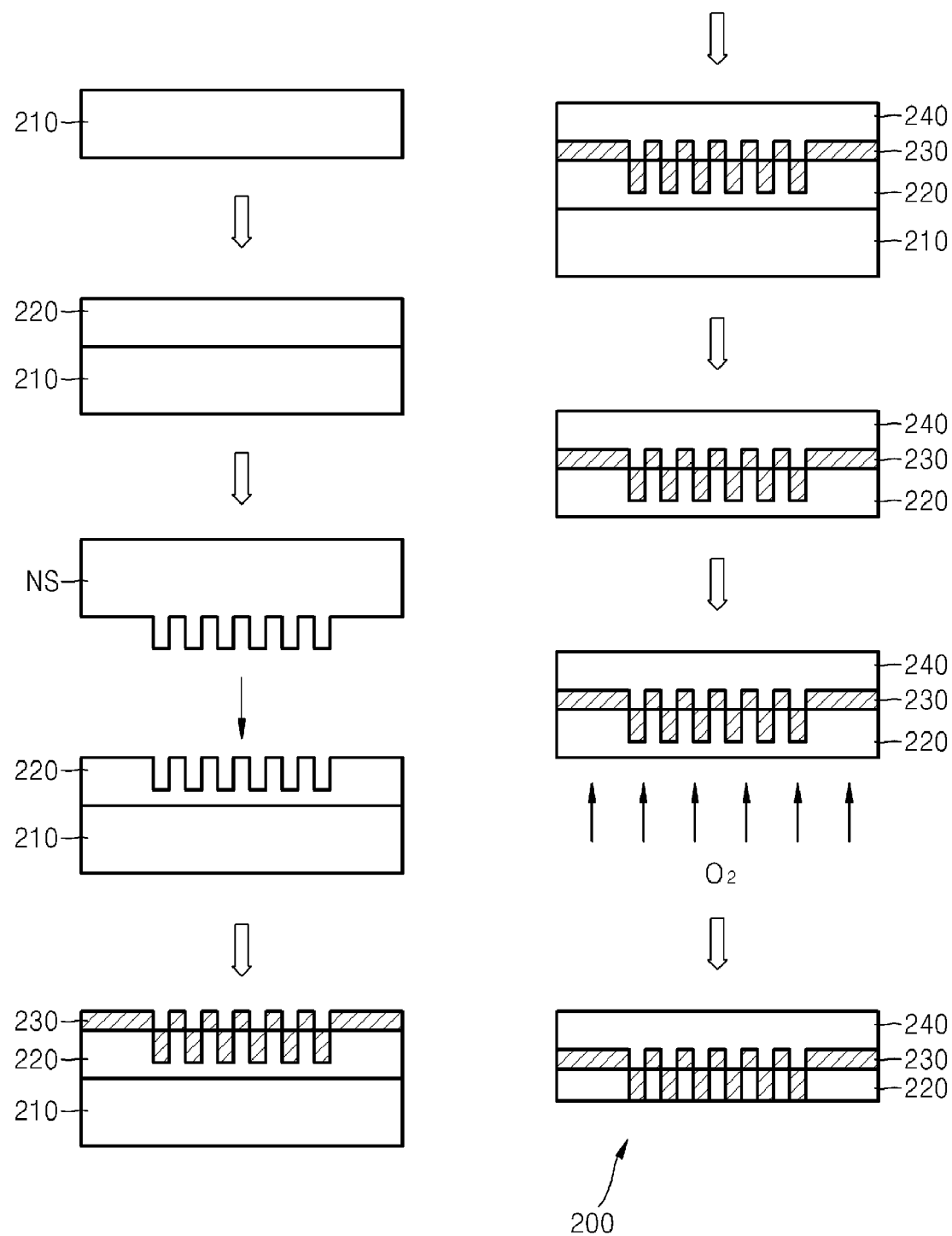
FIG. 4 illustrates a method of manufacturing a master recording medium according to another exemplary embodiment of the present invention.

FIG. 4 illustrates a method of manufacturing a master recording medium according to another exemplary embodiment of the present invention. Firstly, a polymer layer 220 is formed on a substrate 210. Then, an NS on which the servo pattern is embossed is prepared and is used to nano imprint to the polymer layer 220, thereby engraving the servo pattern on the polymer layer 220.

Then, a magnetic material is deposited on the polymer layer 220, thereby forming a magnetic layer 230. The magnetic layer 230 may be formed by, for example, depositing a magnetic material such as CoFe, CoNiFe, and NiFe using sputtering. Here, the magnetic material is deposited not only into holes formed by nano imprinting on the polymer layer 220 but also on the surface of the polymer layer 220.

Then, a back plate layer 240 is formed. The back plate layer 240 is used as a substrate of a stamp formed as a master recording medium and may be formed of a metal such as Ni, CoFe, NiCoFe, and NiFe or an organic material such as PET, polymer, and resin.

Then, the substrate 210 is removed and a portion of the polymer layer 220 that was previously attached to the substrate 210 is removed, for example, using an $O_2$ ashing process, thereby exposing the pattern of the magnetic layer 230 from the lower surface.

In the method according to the current exemplary embodiment, a seed layer for plating the magnetic material is not formed and, instead, depositing is used through a sputtering process. Thus, a master recording medium 200, which is the final resultant, is different from the master recording medium 100 manufactured in FIG. 3. However, the pattern of the magnetic layer 230 appearing on the surface is the same as that of FIG. 3. Also, it is predicted that the magnetic material remaining in the master recording medium 200 in the form of crossing with the pattern appearing on the surface may not affect a magnetic path during magnetic transferring. Therefore, similar to the master recording medium 100 of FIG. 1, the master recording medium 200 according to the current exemplary embodiment can magnetic transfer the servo pattern to the magnetically recording medium according to the pattern of the magnetic layer 230 appearing on the surface.

Figure 5:
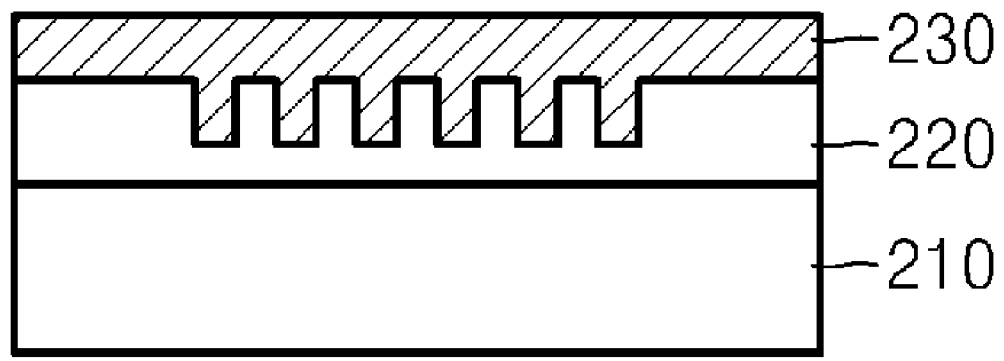
FIG. 5 is a modified example of the method of manufacturing a master recording medium described in FIG. 4.
Figure 5:
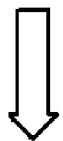
Figure 5:
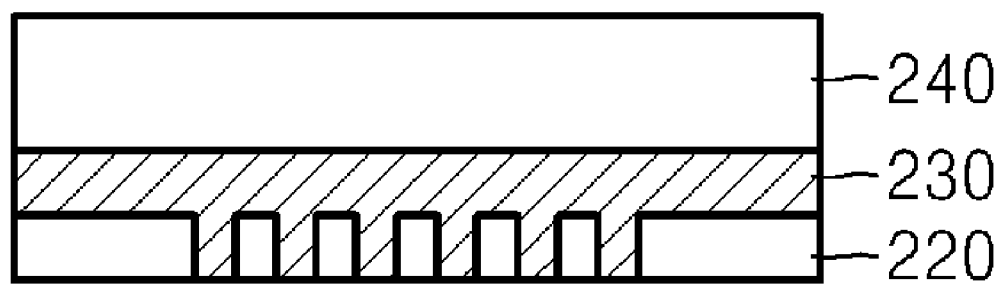
Figure 5:

FIG. 5 is a modified example of the method of manufacturing a master recording medium described in FIG. 4. That is, in depositing the magnetic layer in FIG. 4, FIG. 5 is different from FIG. 4 in that the magnetic layer 230 fills with the holes formed on the polymer layer 220 and is formed to be flat on the upper surface of the polymer layer 220. Then, after performing the processes that are the same as those of FIG. 4, a master recording medium 200' is manufactured.

Figure 6:
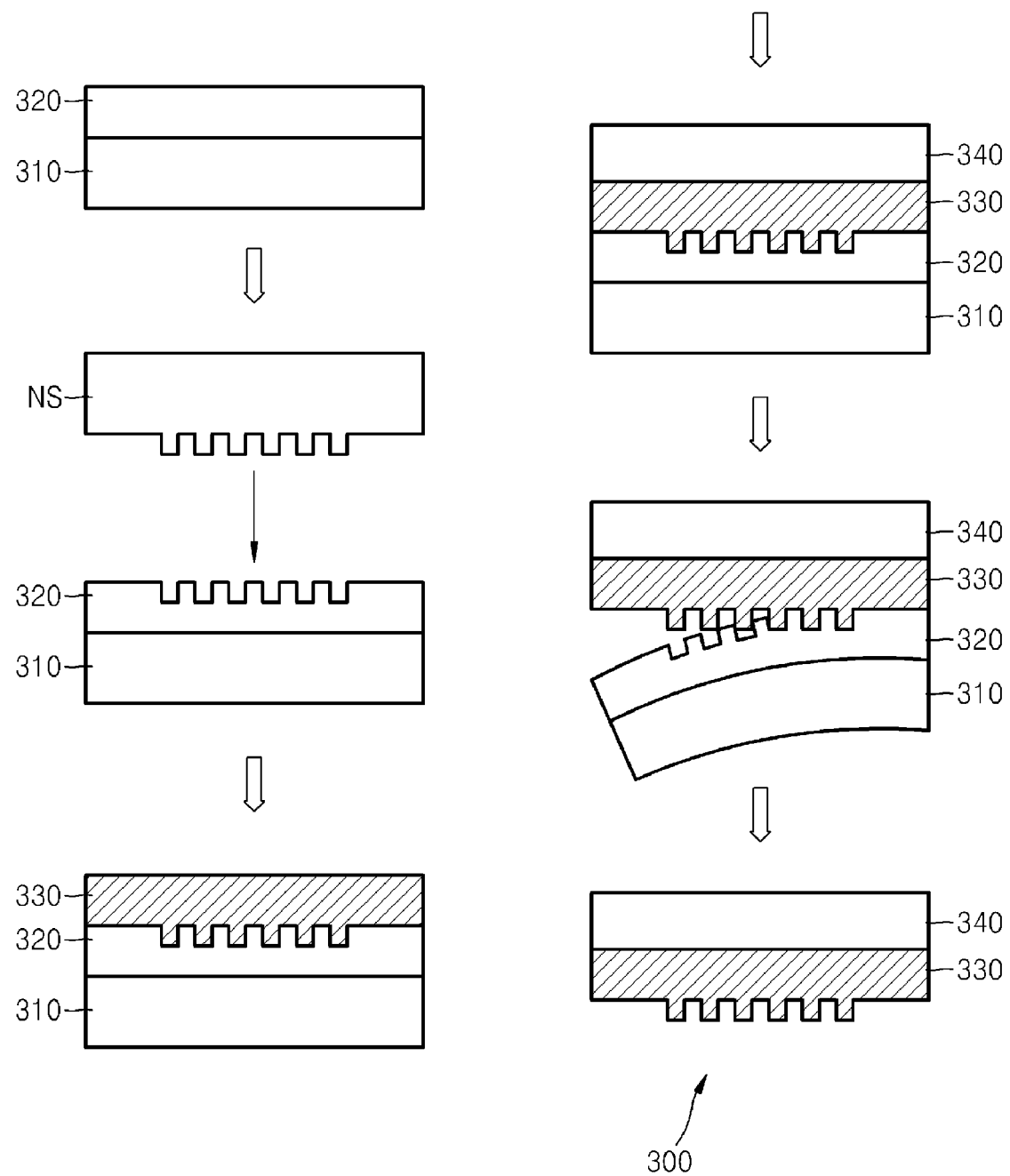
FIG. 6 illustrates a method of manufacturing a master recording medium according to another exemplary embodiment of the present invention.

FIG. 6 illustrates a method of manufacturing a master recording medium according to another exemplary embodiment of the present invention. Firstly, a polymer layer 320 is formed on a substrate 310. Then, an NS on which the servo pattern is embossed is prepared and is used to nano imprint to the polymer layer 320, thereby engraving the servo pattern on the polymer layer 320. In a nano imprinting process, the fine patterned NS is disposed on the polymer layer 320 which is flexible and heat and pressure is applied to the polymer layer 320 so that the polymer layer 320 is hardened and then the pattern is transferred, thereby forming a fine line width.

Then, a magnetic material is deposited on the polymer layer 320, thereby forming a magnetic layer 330. The magnetic layer 330 may be formed by, for example, depositing a magnetic material such as CoFe, CoNiFe, and NiFe using sputtering. The magnetic material is deposited to fill with holes formed on the polymer layer 320 and to be flat on the upper surface of the polymer layer 320.

Then, a back plate layer 340 is formed. The back plate layer 340 is used as a substrate of a stamp formed as a master recording medium and may be formed of a metal such as Ni, CoFe, NiCoFe, and NiFe or an organic material such as PET, polymer, and resin.

Then, the substrate 310 and the polymer layer 320 are peeled off to separate from the magnetic layer 330 and thus, the magnetic layer 330 having an uneven surface is exposed, thereby manufacturing a master recording medium 300.

Here, it is described that in forming the polymer layer 320 on which the servo pattern is engraved, a nano imprinting process is used. However, the polymer layer 320 may be formed by injecting a polymer material to cover the uneven surface of the NS to replicate the NS.

Figure 7:
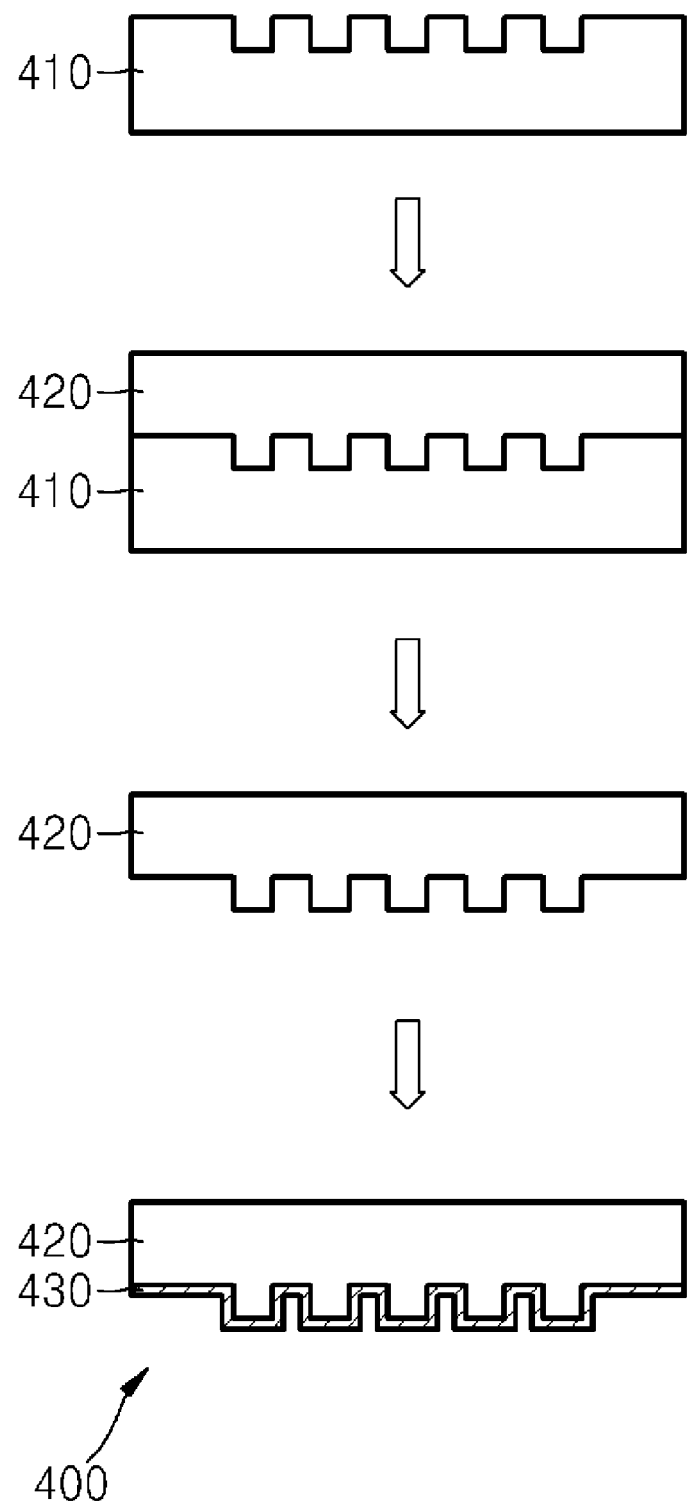
FIG. 7 illustrates a method of manufacturing a master recording medium according to another exemplary embodiment of the present invention.

FIG. 7 illustrates a method of manufacturing a master recording medium according to another exemplary embodiment of the present invention. A substrate 410 on which the servo pattern is engraved is prepared and a polymer material is injected to cover the uneven surface of the substrate 410 to replicate the substrate 410, thereby forming a polymer layer 420 on which the servo pattern is embossed. Then, a magnetic material is deposited along the uneven surface of the polymer layer 420 and a magnetic layer 430 is formed, thereby manufacturing a master recording medium 400 which can magnetic transfer the servo pattern.

Herein, in forming the polymer layer 420, it is described that the polymer material is injected to cover the uneven surface of the substrate 410 to replicate the substrate 410. However, the polymer layer 420 on which the servo pattern is embossed can be formed by a nano imprinting process in which the substrate 410 is used as a stamp for nano imprinting after the polymer material is coated to be flat on the substrate 410.

The master recording mediums 100, 200, 200', 300, and 400 manufactured by using the methods according to the exemplary embodiments above are employed to form MRMs used in magnetic transferring described with reference to FIG. 2 and using which can magnetic transfer the servo pattern including servo information to a target magnetic recording medium. The master recording mediums 100, 200, 200', 300, and 400 use a nano imprinting process so as to realize a fine line width and thus are appropriate to form a servo pattern for a high-density recording magnetic recording medium.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a master recording medium, the method comprising:
   engraving a polymer layer by nano imprinting to form an engraved pattern corresponding to a servo pattern to be formed on a magnetic recording medium;
   forming a magnetic layer which fills in the engraved pattern of the polymer layer;
   forming a back plate layer on the magnetic layer; and
   performing processing to expose the servo pattern on a surface of the magnetic layer that is opposite a surface of the magnetic layer on which the back plate layer is formed.

2. The method of claim 1, wherein the engraving the polymer layer comprises:
   forming a seed layer on a substrate;
   forming the polymer layer on the seed layer;
   imprinting the polymer layer with a nano stamp on which the servo pattern is embossed; and
   removing a residue of the polymer layer remaining in an imprinted part of the polymer layer.

3. The method of claim 2, wherein in the forming the magnet layer, the magnetic layer is formed by plating.

4. The method of claim 3, wherein the performing the processing comprises removing the substrate and the seed layer.

5. The method of claim 1, wherein the engraving the polymer layer comprises:
   forming the polymer layer on a substrate; and
   imprinting the polymer layer with a nano stamp on which the servo pattern is embossed.

6. The method of claim 5, wherein in the forming the magnet layer, the magnetic layer is formed by sputtering.

7. The method of claim 6, wherein the performing the processing comprises:
   removing the substrate;
   etching a part of the polymer layer that is adjacent to the substrate so as to expose the servo pattern on the surface of the magnetic layer.

8. The method of claim 6, wherein the performing the processing comprises separating the substrate and the polymer layer from the magnetic layer.

9. A method of manufacturing a master recording medium, the method comprising:
   preparing a substrate wherein a servo pattern to be formed on a magnetic recording medium is engraved into the substrate to form an uneven surface of the substrate;
   covering the uneven surface of the substrate with a polymer material to form a polymer layer of the polymer material, the polymer layer having a surface on which the servo pattern is embossed, and the surface of the polymer layer facing the uneven surface of the substrate; and
   forming a magnetic layer along the surface of the polymer layer on which the servo pattern is embossed.

10. A method of manufacturing a master recording medium, the method comprising:
    engraving a polymer layer to form an engraved pattern corresponding to a servo pattern to be formed on a magnetic recording medium, wherein the engraving the polymer layer is performed by using a stamp;
    forming a magnetic layer which fills in the engraved pattern of the polymer layer;
    forming a back plate layer on the magnetic layer, and performing processing to expose the servo pattern on a surface of the magnetic layer that is opposite a surface of the magnetic layer on which the back plate layer is formed, wherein the stamp has an embossed pattern which is substantially identical to the servo pattern.

* * * * *